United States Patent [19]
Ishikawa

[11] Patent Number: 5,506,951
[45] Date of Patent: Apr. 9, 1996

[54] SCROLL BAR WITH JUMP TAGS

[76] Inventor: Hiroshi Ishikawa, 89-1-205, Minaminishiura-cho, Tanaka, Sakyo-ku, Kyoto 606, Japan

[21] Appl. No.: 203,387

[22] Filed: Mar. 1, 1994

[51] Int. Cl.⁶ .................................................. G06F 3/00
[52] U.S. Cl. ........................................ 395/157; 395/159
[58] Field of Search ................................ 395/154–161; 345/117–120

[56] References Cited

U.S. PATENT DOCUMENTS

| | | | |
|---|---|---|---|
| 4,831,556 | 3/1989 | Oono | 395/157 |
| 5,039,937 | 10/1991 | Mandt et al. | 395/157 X |
| 5,095,448 | 3/1992 | Obuchi et al. | 395/157 X |
| 5,140,678 | 10/1992 | Torres | 395/159 |
| 5,283,864 | 1/1994 | Knowlton | 395/158 |
| 5,339,391 | 8/1994 | Wroblewski et al. | 395/157 |
| 5,367,623 | 11/1994 | Iwai et al. | 395/157 |

OTHER PUBLICATIONS

Olsen, "Bookmarks", ACM Trans. on Graphics, Jul. 1992, pp. 291–295.

Chimera, "Value Bars", CHI '92, May 7, 1992, pp. 1–2.

Christodoulakis et al, "Browsing Within Time Driven Multimedia Documents", ACM, 1988, pp. 219–227.

Linton et al, "Composing User Interfaces with Interviews", IEEE, 1989, pp. 8–22.

Mills et al, "A Magnifier Tool for Video Data", CHI '92, May 7, 1992, pp. 93–97.

Degen et al, "Working with Audio", CHI-92, May 7, 1992, pp. 413–418.

"Hyper paper", IBM tech. Discl. Bull., Feb. 1991, pp. 283–284.

*Primary Examiner*—Raymond J. Bayerl
*Assistant Examiner*—John E. Breene

[57] ABSTRACT

Disclosed is a scroll bar with jump tags representing preferred set of scroll positions. Jump tags are displayed so that user can select a scroll position in the preferred set. When it is selected, the current scroll position changes immediately, or jumps, to the selected scroll position. User can also create a new jump tag and record current scroll position for jumping back to later.

1 Claim, 12 Drawing Sheets

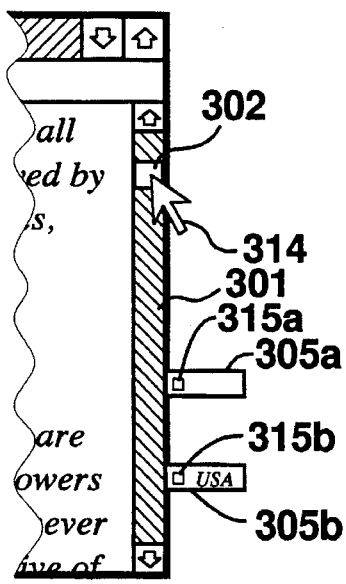
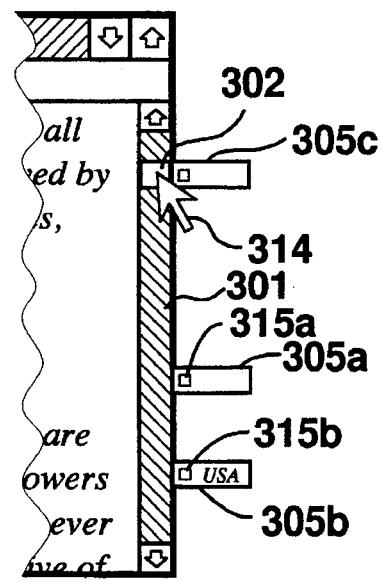
FIG. 3c  FIG. 3d
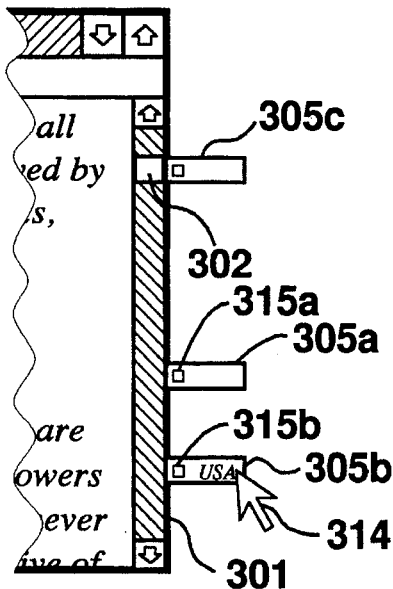
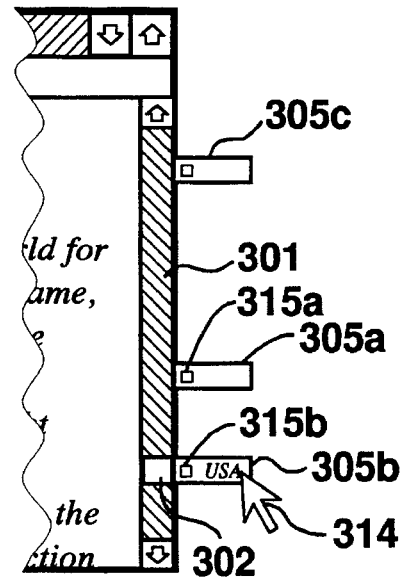
FIG. 3e  FIG. 3f

SCROLL BAR WITH JUMP TAGS

BACKGROUND OF THE INVENTION

1 Field of the Invention

The present invention relates to the user interface of a computer system and, more specifically, to an improved scroll bar which allows a user to change the scroll position easily.

2 Description of the Related Art

Conventional systems provide scroll bars to facilitate scrolling of displayed data. Scroll bars allow a user to move data through a display area, thereby revealing previously hidden portions of the data. Illustrated in FIG. 1 is a typical (vertical) scroll bar used with a window. At each end of scroll bar 11 are scroll arrows 13 and 14. The scroll arrows point in the direction that the viewable portion "moves" over the data, as if the data is fixed. When a user clicks a scroll arrow, the data in the window appears to move in the opposite direction of the arrow. Along scroll bar 11, an indicator called a thumb (also called the scroll box, elevator, or slider) 12 moves to represent relatively how far the current view of the data is from the top. For example, if the current view is at the middle of the data, the thumb is in the middle of the scroll bar. This behavior of the thumb makes it a useful visual indicator for users. The user can also drag the thumb along the scroll bar to move to a different view of the data. Scrolling with a scroll bar is an easy and intuitive practice and is widely known in the art. Even though scrolling can be easy and intuitive, it is a nonessential part of the user's task and it is desirable to avoid frequent scrolling. However, users tend to repeatedly move to some particular portions of the data, or "scroll positions". For example, a user of a word processor system editing a document may wish to refer some important portions of the document repeatedly in the course of editing. In such a case, every time the user needs a reference, he or she would have to use scroll bar to view the desired portion, possibly making original portion being edited hidden, and use the scroll bar again to return to the original portion to continue editing. This method is cumbersome and unproductive, especially when repeated frequently.

Another problem with scroll bars is difficulty of returning to precisely the same position. In some cases, such as in a drawing application, scroll bar represents relatively broad range. In such cases, retaining once realized view manually is difficult, if not impossible.

Some application programs, mostly word processors or text editors, provide a function to solve these problems. This function, often called the bookmark function, allows a user to insert a "bookmark" in a location within a document and later jump back to the location. In the above example, a user can insert a "bookmark" in the frequently referred portion.

Use of this function, however, is not very intuitive. When inserting a bookmark, the user typically is prompted to input a name to identify the bookmark. It is by this name that the user specifies the bookmark when he or she wishes to go back to the position. This process has no visual indication and, in particular, has no relationship with the scroll bar, which visually represents the whole of the data.

Another problem of this prior technique is that the operation needed to invoke the function differs from application to application, making it more difficult for users to become familiar with use of this function.

SUMMARY OF THE INVENTION

OBJECTS AND ADVANTAGES

Accordingly, it is an object of the invention to provide an intuitive and application-independent user interface to allow the user jump to locations of a data, thereby reducing the user operation.

It is another object of the invention to provide an intuitive and application-independent user interface to allow the user to select some special alternatives more easily than other alternatives from a relatively broad range, while enabling the user to select intuitively from the whole of the range.

These and other objects, features and advantages of the invention will become apparent from a consideration of the ensuing description and drawing.

SUMMARY OF THE INVENTION

In the present invention, a display object appears on the display screen. This display object represents a spectrum of alternatives. A spectrum of alternatives is defined herein as a set of alternatives which has a natural spatial structure. For example, lines in a document can be represented by line numbers. Such a set of integers between specified minimum and maximum is called herein a one-dimensional spectrum of alternatives. A one-dimensional spectrum has a spatial structure since one can arrange the numbers on a line segment naturally. Similarly, cells on a spread sheet can be represented by a two-dimensional spectrum of alternatives, i.e., by row number and column number.

The display object represents the spectrum so that the spatial structure can be seen visually. Subset of the spectrum of alternatives is called herein a "selection", which may consist of a single alternative. A user can choose a current selection. When current selection is defined, it is indicated on the display object. In the present invention, a set of preferred selections is specified and, when the user requests, one of the preferred selections becomes the current selection. The preferred selections are represented visually on the display, so that the user can select them easily. Preferably, user may change the set of recorded selections.

In the preferred embodiment, the display object is of elongated shape, and is called a scroll bar. The scroll bar represents a one-dimensional spectrum of alternatives, and each alternative is called a scroll position. In the preferred embodiment, only relevant selections are those consist of a single alternative. In other words, in the preferred embodiment, a selection and an alternative means the same thing, which is called a scroll position. Accordingly, in the preferred embodiment, selections are called scroll positions. Moreover, in the preferred embodiment, the user can add the current scroll position to the set of preferred scroll positions, or "record" it. Thus a preferred scroll position is called a recorded scroll position. For each recorded scroll position, an item, called a jump tag, appears on the screen attached to the scroll bar and so that its relative location in the longitudinal direction of the scroll bar represents the corresponding scroll position, and when the user clicks one of the jump tags, the current scroll position of the scroll bar is moved to the scroll position corresponding to the clicked jump tag.

BRIEF DESCRIPTION OF THE DRAWINGS

FIGS. 3c–3f shows various operations in the preferred embodiment. These drawing figures omit irrelevant part of the window.

FIG. 3c illustrates the before creating of a jump tag in the preferred embodiment.

FIG. 3d illustrates the after creating of a jump tag in the preferred embodiment.

FIG. 3e illustrates the before jumping by a jump tag in the preferred embodiment.

FIG. 3f illustrates the after jumping by a jump tag in the preferred embodiment.

DESCRIPTION OF THE PREFERRED EMBODIMENT

Overview of the computer system of the preferred embodiment

Hardware

Figure 1:
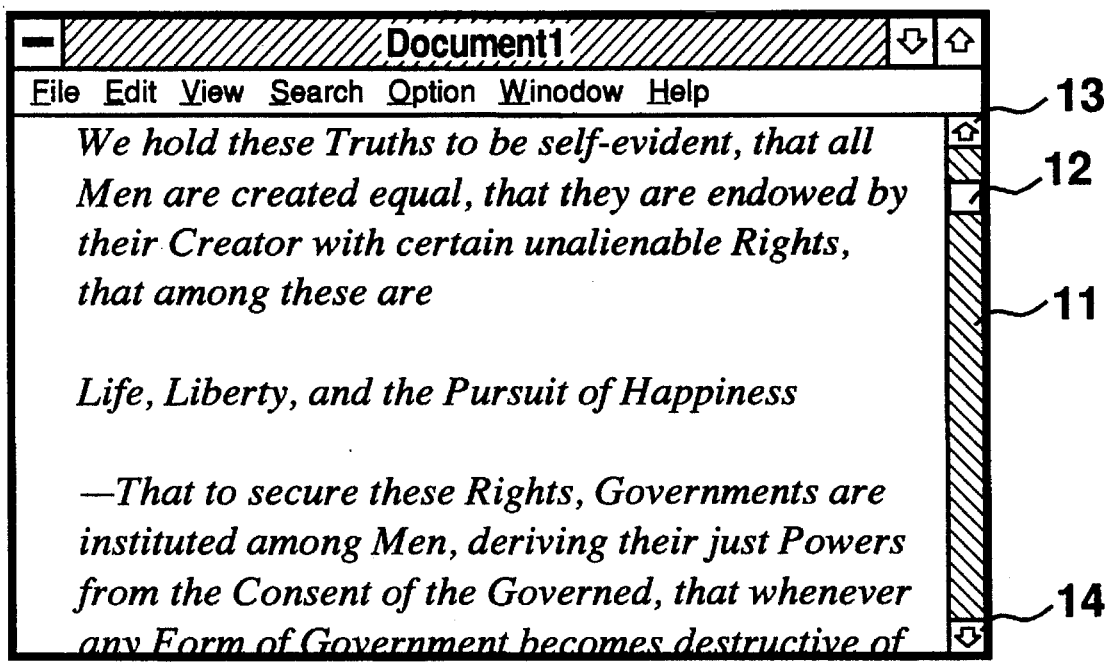
FIG. 1 illustrates a prior art scroll bar used within a window.
Figure 2:
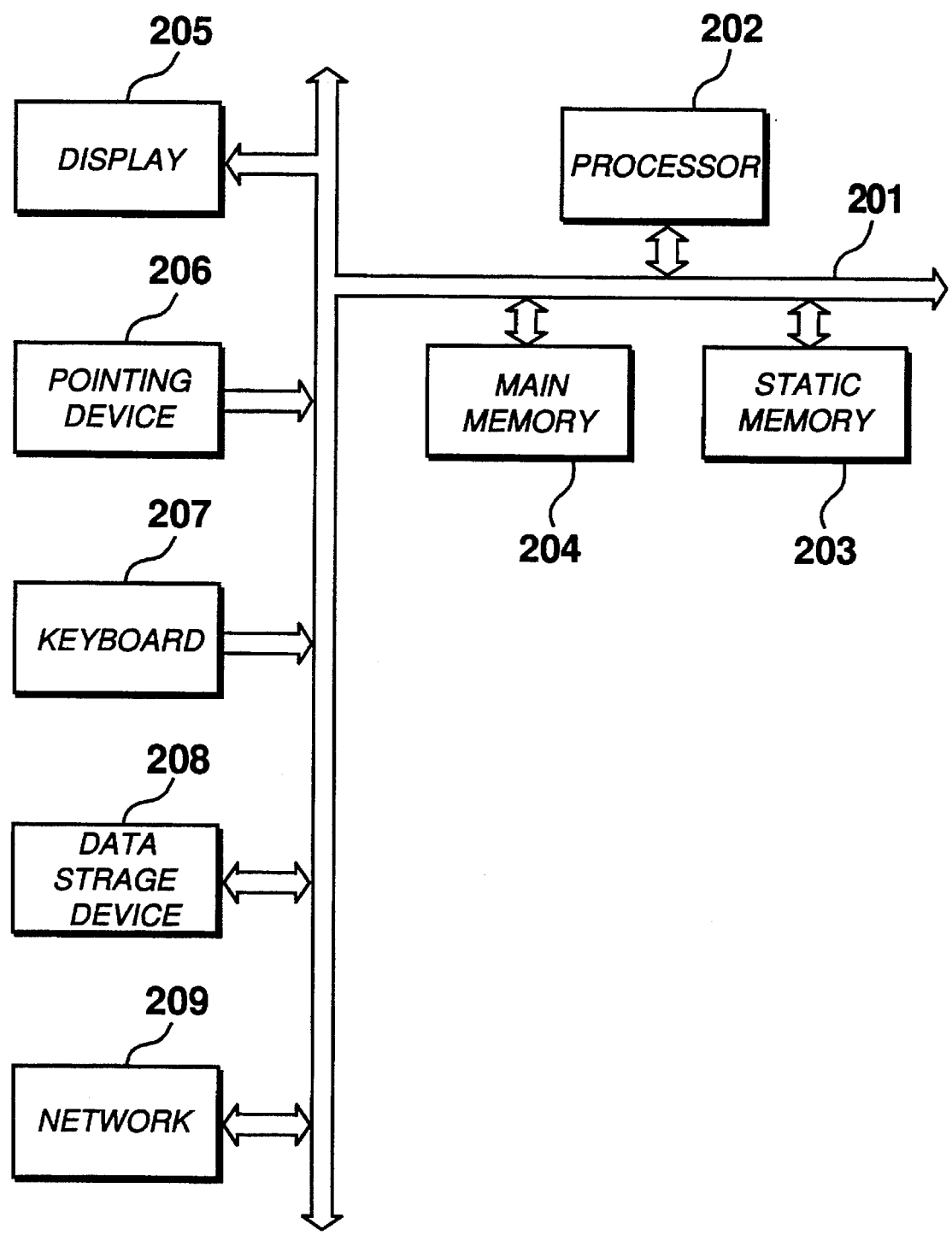
FIG. 2 illustrates the computer system of the preferred embodiment.

The computer system of the preferred embodiment is described with reference to FIG. 2. The present invention may be implemented on a general purpose microcomputer, such as one of the members of the IBM Personal Computer family, or one of several work-stations or graphics computer devices, or one of portable computers, such as those called Personal Digital Assistants, which are commercially available. A computer system as may be utilized by the preferred embodiment generally comprises:

(a) a bus or other communication device 201 for communicating information; and, coupled with bus 201, (b) a processor 202 for processing information;

(c) a read only memory (ROM) or other static storage device 203 for storing information and instructions for processor 202;

(d) a random access memory (RAM) or other storage device 204 (commonly referred to as a main memory) for storing information and instructions for processor 202;

(e) a display device 205, such as a cathode ray tube, liquid crystal display, etc., for displaying information to the computer user; and (f) a pointing device 206, such as a mouse, track-ball, or a pen device, coupled with at least one user-signal-detecting device such as a button on a mouse, for pointing locations on the screen of display device 205 and for communicating information and command selections to processor 202.

The system may also include, also coupled with bus 201, (g) an alphanumeric input device 207, such as a keyboard;

(h) a data storage device 208, such as a magnetic disk and disk drive, for storing information and instructions; and (i) a network device 209, for communicating with other computer systems.

Software Architecture

The preferred embodiment utilizes a graphical user interface (GUI) environment. GUI is well known in the art and is employed by various operating environments, including the Macintosh® Operating System available from Apple® Computer Inc. of Cupertino, Calif. and the Microsoft® Windows™ Operating System available from Microsoft® Corporation of Redmond, Wash. The present invention can be generally used as a substitute for scroll bars of prior art, which, for instance, GUI environments provide. Of course, the present invention may be implemented as a part of application programs, e.g., word processor, or as a part of user interface of single purpose system, which may not utilize scroll bars of prior art.

The GUI system utilized by the preferred embodiment is based on Message-Driven Architecture. Message-Driven Architecture is well known in the art and employed in most GUI systems. In the architecture, any user input or system event is translated into a message, which is sent to objects that are relevant to the input or event. For example, when the cursor is placed on a scroll bar, a message accompanied by information, such as the position of the cursor or status of the button on the pointing device, is sent to the scroll bar. Sending a message to an object usually means calling a subroutine called the message processing function or window procedure. The parameters to this subroutine describe the particular message. In the GUI system utilized by the preferred embodiment, objects to which the system sends messages are classified by "object classes". Scroll bars form such a class in the system. The system, or an application program provides a message processing function for each object class. Each object belonging to an object class is sometimes called an "instance" of the class. Therefore, sending a message to an object means calling the message processing function for the object's class. Parameters of the function describe the message and specify the particular instance the message is sent to.

User Interface

In the following explanation of preferred embodiment, user operations called "clicking", "double clicking", and "dragging" are used. These are well known in the art. "Clicking" refers to depressing a button on the pointing device and immediately releasing it. "Double clicking" refers to rapidly clicking twice. "Dragging" a display object refers to positioning a cursor on the object, pressing down the button on the pointing device, and moving the cursor while the button is pressed. Then the object being dragged, or its visual representation, such as its outline, moves along the cursor. It would be obvious to one skilled in the art to substitute these operations with other operations. Clicking and double clicking are methods to notify the computer a selection of a location on the display screen. This may be accomplished by, for example, moving the cursor with cursor control keys and pressing a key to notify that current cursor position is the selection. Similarly, one may accomplish the same purpose of dragging, by selecting a display object first, then selecting a location to which he or she wishes to "drag" it to, and notifying the system in some way to "drag". Such deviations would not depart from the spirit and scope of the present invention.

Description of Display Objects

Figure 3A:
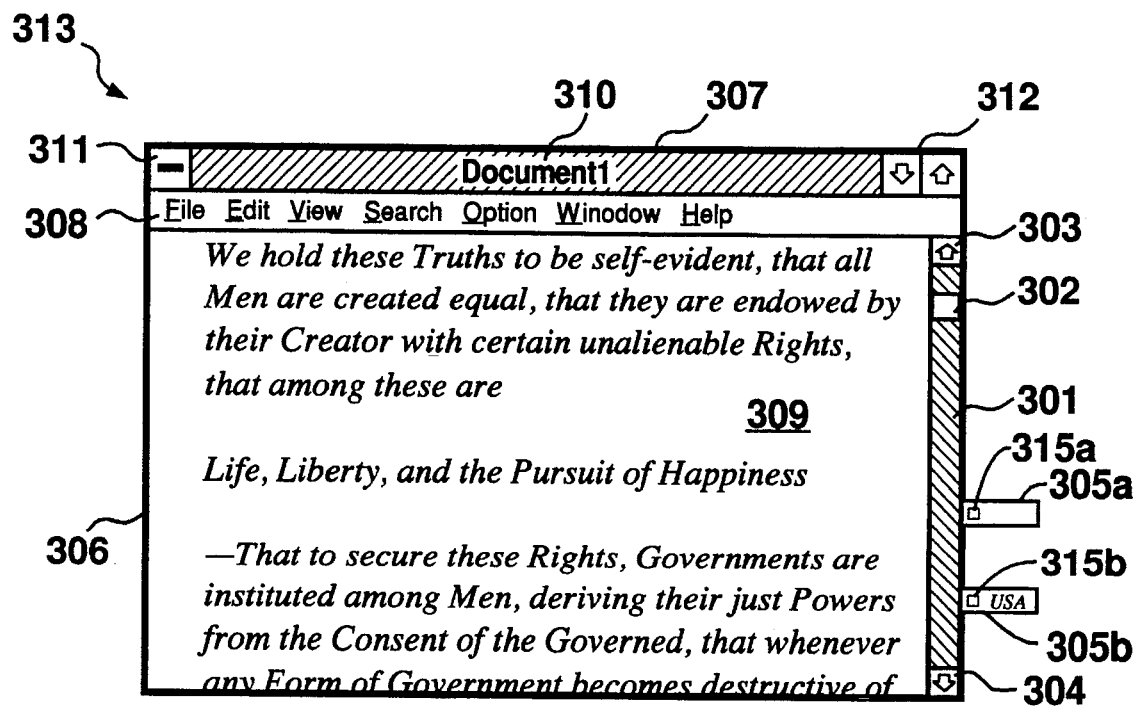
FIG. 3a illustrates a scroll bar with jump tags of the preferred embodiment used with a window.

Referring now to FIG. 3a, a scroll bar of the preferred embodiment is illustrated. A scroll bar 301 is displayed in a window 313, which shows an application within it. As an example, the application shown here is a word processing program. However, the scroll bar of the preferred embodiment can be used with other applications that utilize the scroll bars of prior art. Window 313 includes a border or frame 306 that forms the outer boundary of the window. Contained within border 306 are a title bar 307, an action bar 308, and a client area 309. Scroll bar 301 is accompanied by a thumb 302, an up scroll arrow 303, and a down scroll arrow 304. Displayed along the side of scroll bar 301 are jump tags 305a and 305b, which include menu areas 315a and 315b respectively. The reference numeral 305 is used to refer the jump tag in general, while suffixed numeral is used for one of jump tags shown in figures. Similarly, numeral 315 and suffixed numeral such as 315a are used.) Title bar 307 includes a window title 310, which identifies the window, a system menu icon 311, and window sizing icons 312. System menu icon 311 allows the user to display a pull-down menu containing actions that the user can perform on the window. Window sizing icons 312 allow the user to size the window quickly. Action bar 308 contains a list of the commands of the application shown in the window. The application displays information needed for its function, e.g., a document being edited by a word processing program, within client area 309. Scroll bar 301 shown here is a vertical scroll bar and used to control the vertical scrolling of the document displayed within client area 309.

Figure 3B:
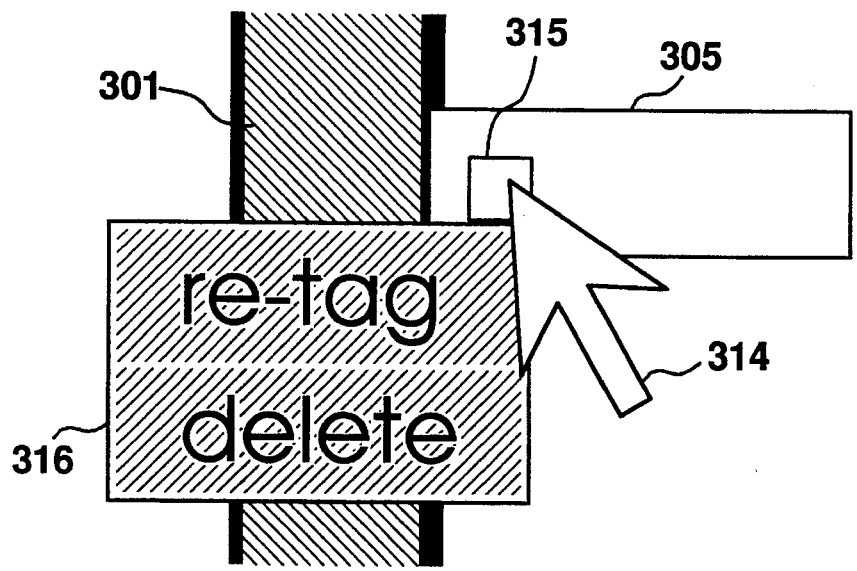
FIG. 3b is a close up of a jump tag of preferred embodiment with a pop-up menu shown.

In FIG. 3b there is shown a close up of a jump tag 305. On jump tag 305 is a menu area 315. If the user clicks with cursor 314 placed on menu area 315, a pop-up menu 316 appears.

Operations in the Preferred Embodiment

Basic Operations

User operation in the preferred embodiment is explained with reference to FIGS. 3a–3j, and first to FIG. 3a. The basic operations for usual scrolling are the same as with the scroll bars of prior art. For example, when a user clicks up scroll arrow 303, the document in client area 309 appears to move downward as if the viewable portion moves upward over the fixed document. At the same time, thumb 302 moves upward along scroll bar 301 representing relatively how far the current view of the document is from the top of the document. The user can also drag thumb 302 along scroll bar 301 to move to a different view of the document.

Recording Scroll Position

In the preferred embodiment, the user can record the current "scroll position". The term "scroll position" refers to the logical position the system uses to represent and identify the position in the spectrum of alternatives scroll bar 301 represents, rather than the visible position of thumb 302 on the display. Recorded scroll positions are indicated by jump tags 305. The operation with which the user records current scroll position is illustrated in FIGS. 3c and 3d. The former shows the same situation as FIG. 3a, except that a cursor 314 is now shown on thumb 302. The user may record current position by double clicking thumb 302, i.e., placing cursor 314 on thumb 302, and double clicking. When the user requests by double clicking, the preferred embodiment records current scroll position and indicates it to the user by creating and displaying a jump tag 305c next to thumb 302, as shown in FIG. 3d. Optionally, the user can name jump tag 305, for later convenience, anytime the jump tag is displayed. This is accomplished by double clicking the jump tag and inputting the name upon prompt. The name is displayed on the jump tag as can be seen on the jump tag 305b, which is named "USA".

Jumping

Figure 3G:
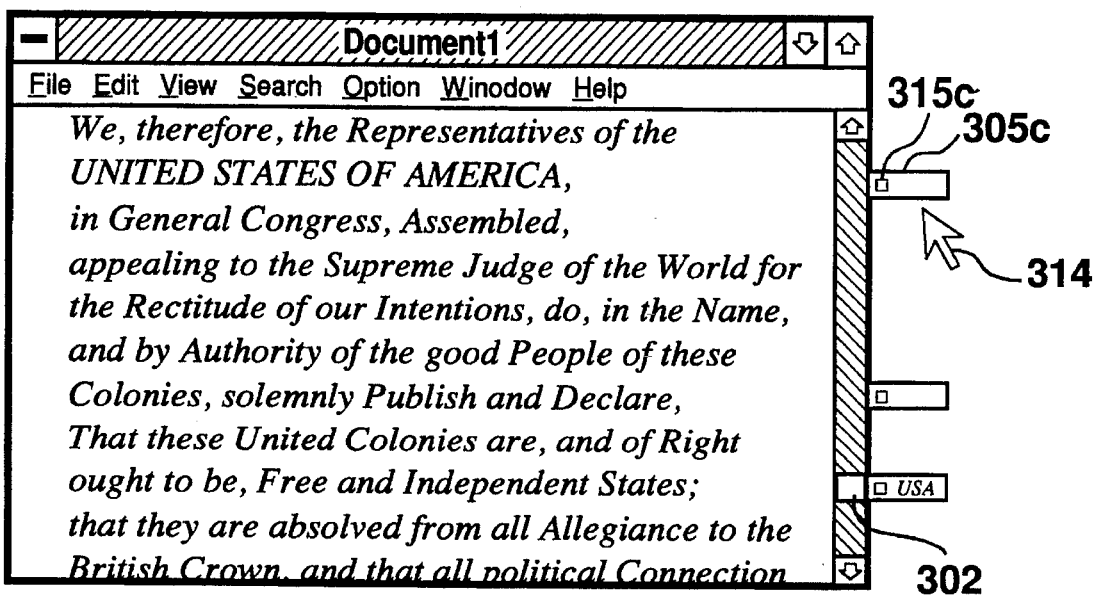
FIG. 3g illustrates the before jumping by a jump tag in the preferred embodiment.
Figure 3H:
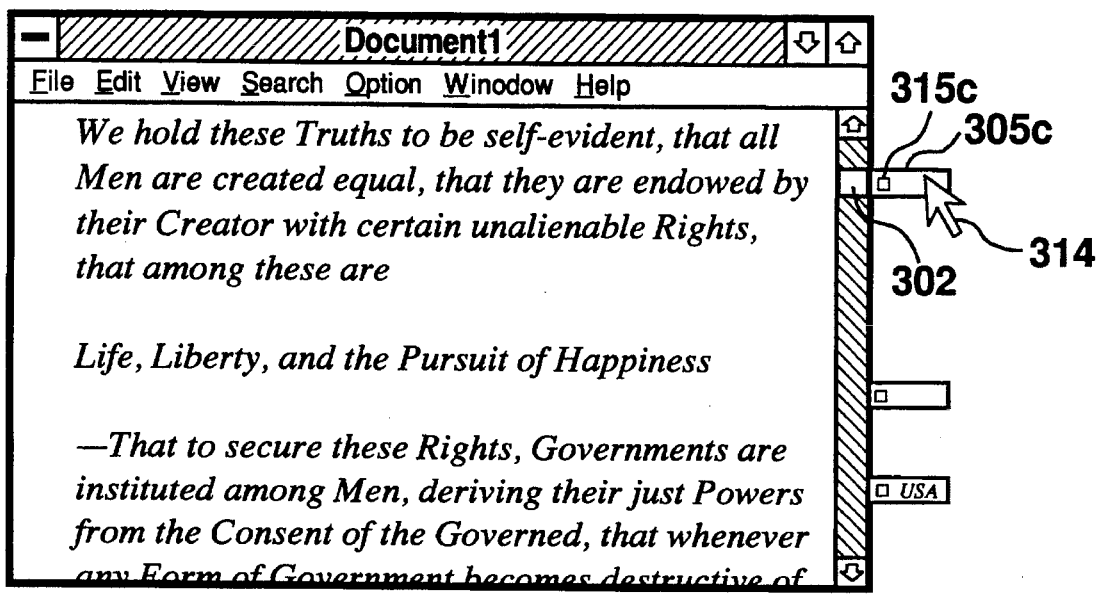
FIG. 3h illustrates the after jumping by a jump tag in the preferred embodiment.

Comparing FIG. 3e with FIG. 3f illustrates how to invoke a "jump" using jump tag 305. In FIG. 3e, cursor 314 is placed on jump tag 305b, which corresponds to the position the user wishes to jump to. It should be noted that the cursor is outside the menu area 315b. Pressing down the button on the pointing device with cursor 314 in this position causes a "jump". Display now looks as in FIG. 3f, where thumb 302 has moved and is next to clicked jump tag 305b. This is the position where thumb 302 was when the user double clicked it and created jump tag 305b. The position represents the recorded scroll position corresponding to jump tag 305b. Accordingly, the view of the document has changed to the one represented by the new position of thumb 302, as shown in FIG. 3g. Placing cursor 314 on jump tag 305c and clicking the button on the pointing device causes another jump, whose consequence is shown in FIG. 3h. Thumb 302 and the view of the document are brought back to where they were in FIG. 3a, or FIGS. 3c–3e.

Moving Jump Tags

Figure 3I:
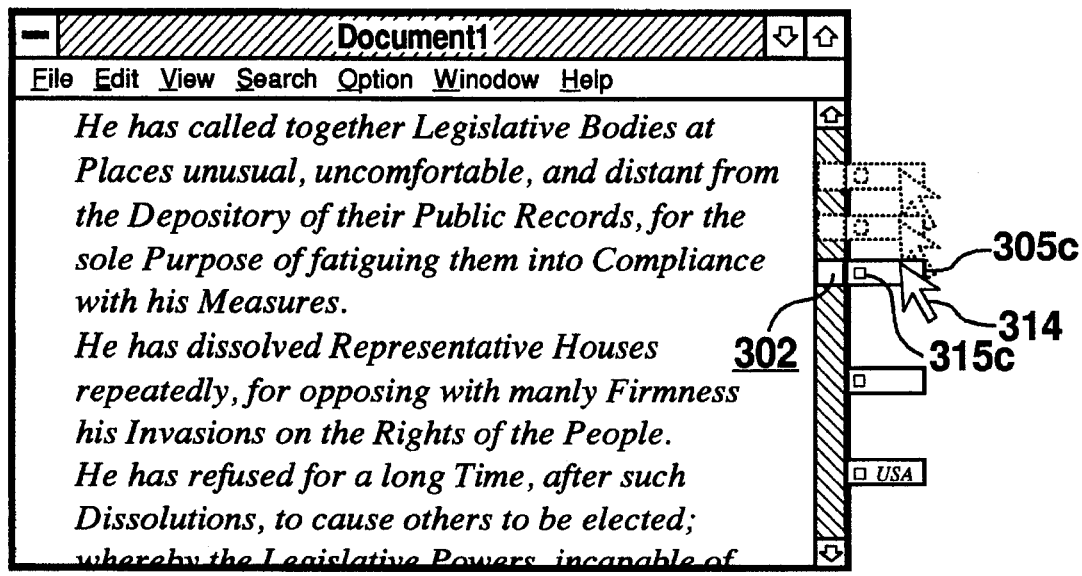
FIG. 3i illustrates the dragging of a jump tag in the preferred embodiment.
Figure 3J:
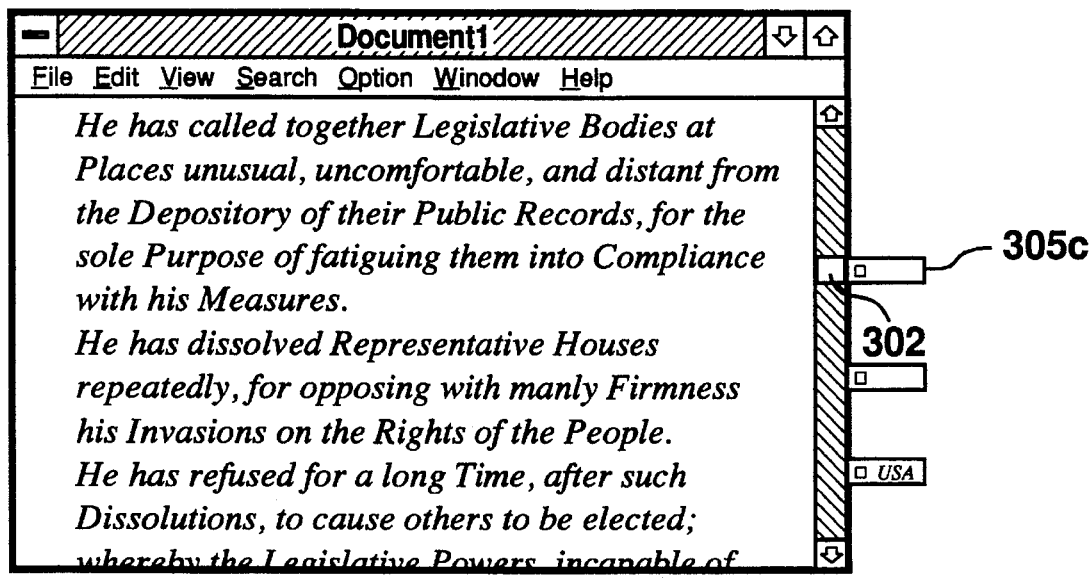
FIG. 3j illustrates the after dragging a jump tag in the preferred embodiment.

In the preferred embodiment, the user can move jump tag 305 along scroll bar 301 by dragging, with cursor 314 placed outside menu area 315. In this way, the user can adjust the scroll position these jump tags represent. In FIG. 3i, dragging of jump tag 305c is illustrated. As mentioned above, to drag jump tag 305c, first the user needs to press down the button on the pointing device while positioning cursor 314 on jump tag 305c, outside menu area 315c. This causes a jump, which moves thumb 302 next to jump tag 305c, if it has not already been there. Hence, in the beginning of the dragging, thumb 302 is adjacent to jump tag 305c. If the user moves cursor 314 while pressing the button, the system detects a dragging and outlines jump tag 305c and thumb 302. While being dragged, the outline of thumb 302 remains adjacent to that of jump tag 305c. In other words, they are dragged together, their relative position remaining unchanged. This condition confines the move of the outlines, since thumb 302 can only move within scroll bar 301. This means that jump tags can only be moved along scroll bar 301. When the dragging is finished, i.e., when the button is released, thumb 302 and jump tag 305c are moved to the position of their outlines, which are cleared in turn. Accordingly, current scroll position is changed to match current position of thumb 302. Also, the recorded scroll position corresponding to dragged jump tag 305c is set to current scroll position so that the displayed position of jump tag 305c represents the recorded scroll position correctly. Therefore, if the user invokes a jump by clicking jump tag 305c after the dragging, the view of the document will change to the one shown in FIG. 3j, which corresponds to current scroll position in the end of the dragging, not to the view shown in FIG. 3h, which has been represented by jump tag 305c before the dragging. Referring back to FIG. 3b, if the user clicks placing cursor 314 on menu area 315 of jump tag 305, there appears a pop-up menu 316. Pop-up menu 316 shows actions the user can perform on the jump tag. If the user selects "re-tag" item, recorded scroll position corresponding to the jump tag is changed to current scroll position, which may result in moving the jump tag itself, if the corresponding scroll position is different from current scroll position. This provides another way to adjust the recorded scroll position of a jump tag. Finally, if the user selects "delete" item, the preferred embodiment deletes the jump tag.

Software Implementation of the Preferred Embodiment

Overview

In the system that may be employed by the preferred embodiment of the present invention, the behavior of a GUI object in an object class, e.g., scroll bar class, is determined by its response to messages, that is, by message processing function for the class. The preferred embodiment of the present invention is implemented by changing the response of instances of scroll bar class by substituting message processing function. The new message processing function responds to most messages in the same way as the original function. These messages include: clicking on scroll arrows, dragging the thumb, or a query of current scroll position. This behavior provides familiar user interface of the scroll bar to the user and enables the preferred embodiment to function with other programs, without modification on their part. On the other hand, it responds to other messages, e.g., double clicking the thumb, differently. Moreover, it responds to additional messages, e.g., a request to record current position, in order to provide the novel feature of the present invention. If an application program is tailored to support these new messages, it can utilize the new functionality of the invention more effectively. For each object class, the system maintains data and subroutines. The data includes instance data of each object belonging to the class and some global information that is relevant to the whole of the class. The instance data of a scroll bar include:

Current range, which is defined by two numbers, the minimum and the maximum.

Current scroll position, which is defined by a number between the minimum and the maximum of current range.

A data structure containing jump tag information. For each jump tag belonging to the scroll bar, the preferred embodiment stores information of the jump tag such as corresponding scroll position, name, and position on the screen in this data structure.

Range adjustment mode. This is explained below, under the heading "Processing Messages in the Preferred Embodiment".

Other information such as an identifier of the window the scroll bar belongs to, or size and position of the scroll bar on the screen, etc.

Figure 4:
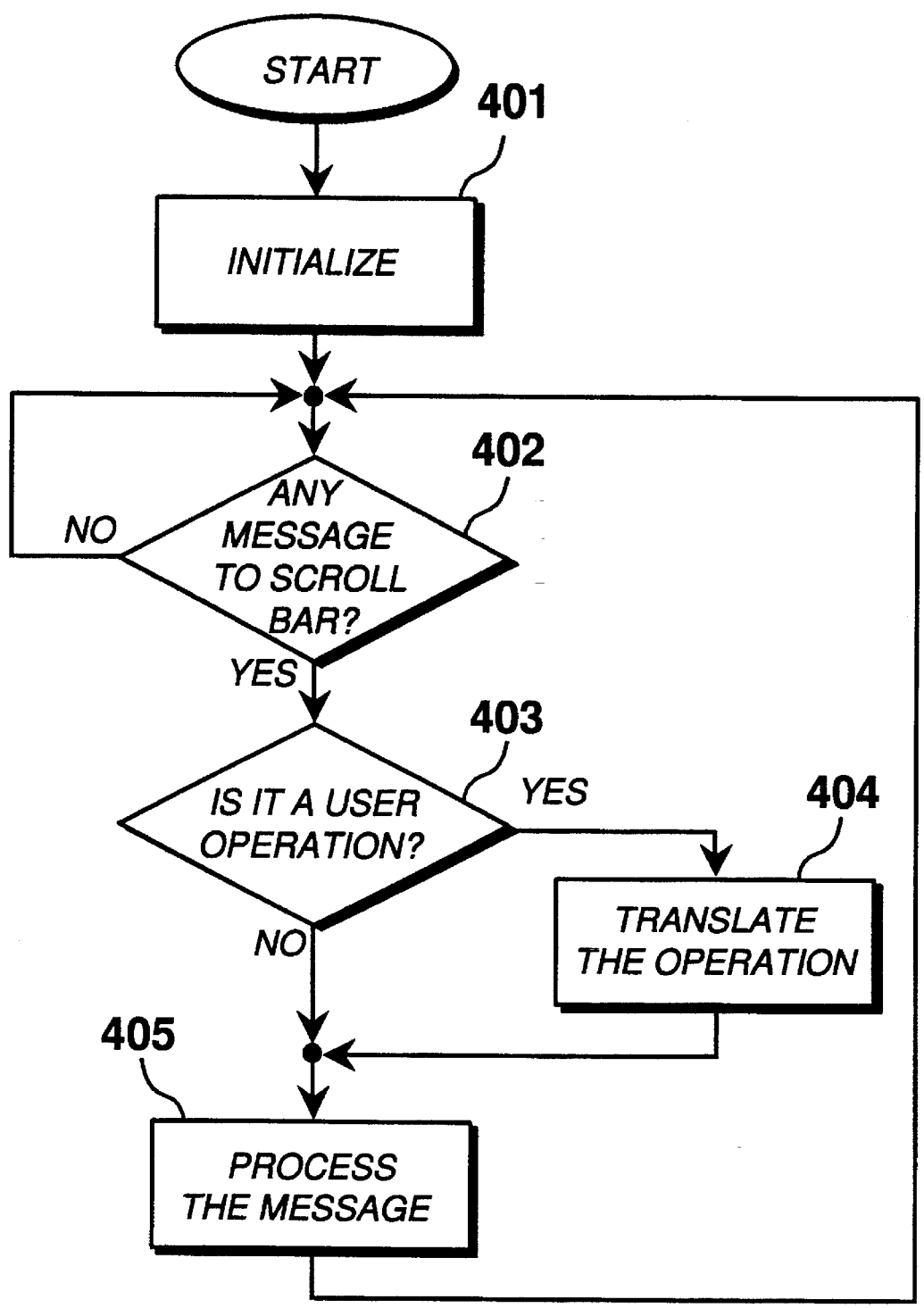
FIGS. 4, 5, 6a–6c are flowcharts outlining the process and steps a computer system would undertake in utilizing the preferred embodiment of the present invention.

When the preferred embodiment creates a scroll bar, it initializes its instance data. Referring now to FIG. 4, there is shown a flowchart of processing in the preferred embodiment. In block 401, the scroll bar subsystem is initialized. After initialization, the system is monitored for input and processing. If any user input or any request by other programs for a scroll bar occurs, the system sends a message to the scroll bar. Referring to decision block 402, the scroll bar subsystem waits until one of scroll bars receives a message. If the received message represents a user operation (decision block 403), it translates it to more abstract or functional message at block 404, before it processes the message at block 405.

Translating User Operations

Figure 5:
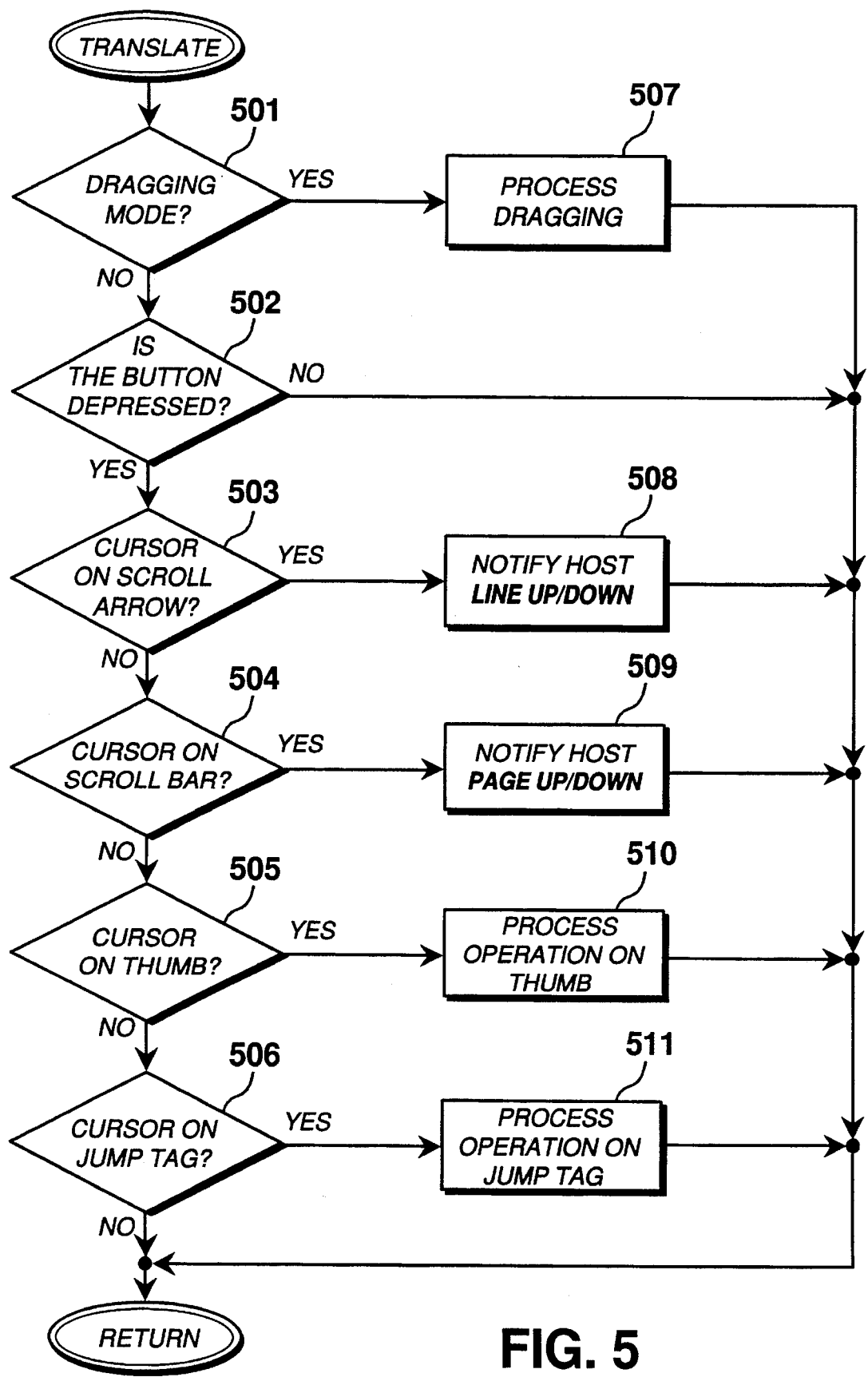

Referring now to FIG. 5, there is shown details of translating of messages representing user operations on the scroll bar, which is referred to generally at block 404 in FIG 4. The scroll bar subsystem is in either NORMAL MODE or DRAGGING MODE. It is in NORMAL MODE at the initialization. At decision block 501, the scroll bar subsystem decides if it is in DRAGGING MODE, and if so, it processes dragging at block 507 and returns. If not, it then tests at decision block 502 if the button on the pointing device is depressed. If it is not depressed, the translating ends and the subsystem returns.

If the button is depressed, next the position of the cursor is tested. If the cursor is on one of scroll arrows 303 and 304 (decision block 503), the scroll bar subsystem notifies the host window at block 508, that the user has requested a scrolling by one unit, by sending LINE UP (down scroll arrow) or LINE DOWN (up scroll arrow) message to the host window, and returns. The host window is the window the scroll bar belongs to. When the host window receives LINE UP (resp. LINE DOWN) message, it scrolls upward (resp. downward) the data displayed in it by one unit, e.g., one line if the scroll bar controls vertical scrolling of a document. The host window then sends a SET POSITION message back to the scroll bar to adjust the scroll position accordingly.

If the cursor is on scroll bar 301 itself (decision block 504), the scroll bar subsystem notifies the host window at block 509, that the user has requested a scrolling by a "page", by sending PAGE UP (if cursor 314 is on the area of scroll bar 301 between thumb 302 and down scroll arrow 304) or PAGE DOWN (if cursor 314 is on the area of scroll bar 301 between thumb 302 and up scroll arrow 303) message to the host window, and returns. The host window scrolls the data by an amount, typically by a "windowful", when it receives these messages, and sends a SET POSITION message back to the scroll bar to adjust the scroll position accordingly.

If the cursor is on thumb 302 (decision block 505), or on one of jump tags (decision block 506), the scroll bar subsystem processes these operations at block 510 or at block 511 (details of the processing will be described below), and returns.

It should be noted that the message processing function in the preferred embodiment is implemented so that it responds to user operations in exactly the same way as the message processing function of the scroll bar of prior art, where no jump tags are involved. Thus the implementation can be seen as an addendum to the message processing function of scroll bar class that GUI environment originally provides. In FIG. 5, the addendum includes blocks 506 and 511.

Dragging

Figure 6A:
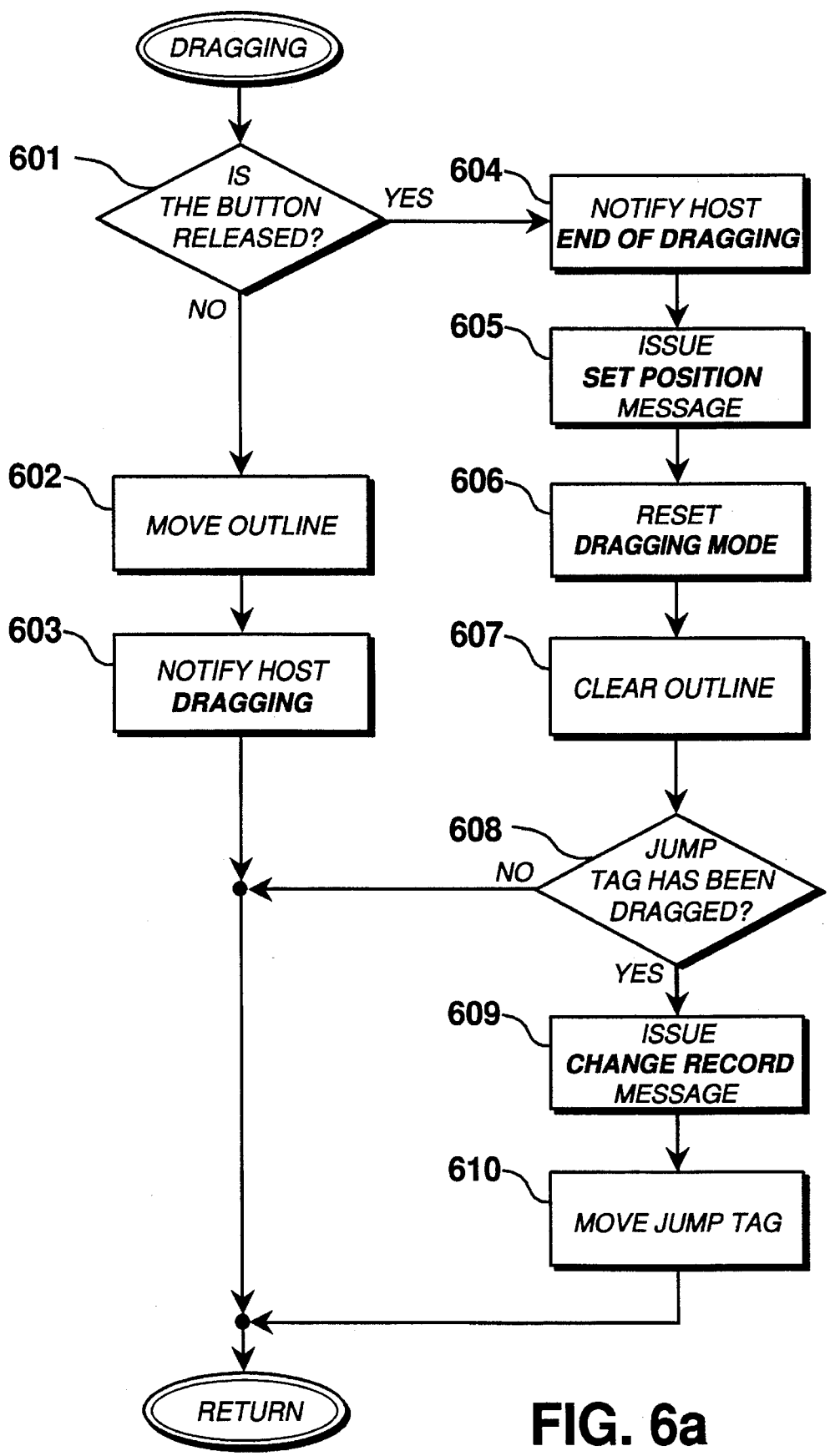
Figure 6B:
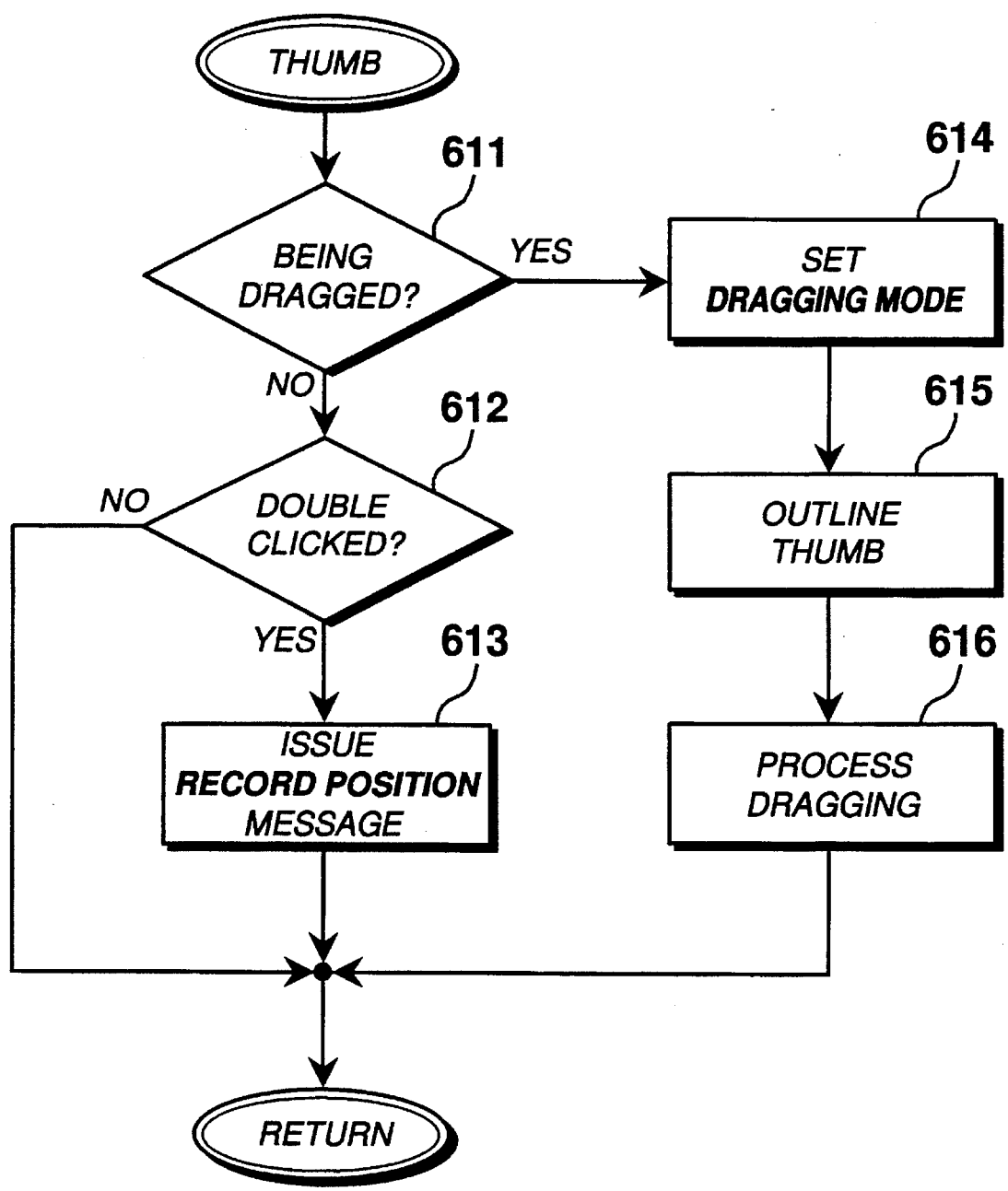
Figure 6C:
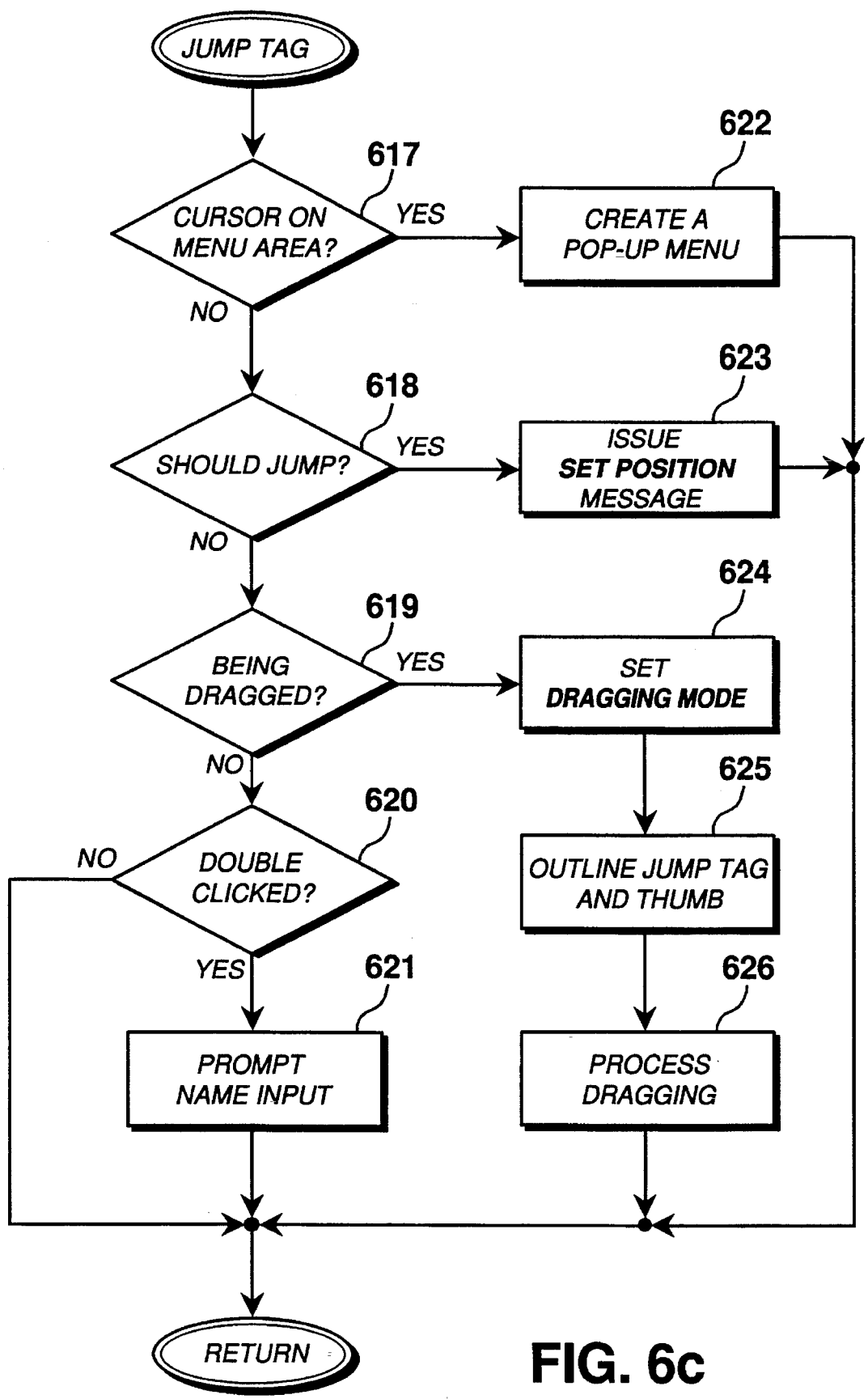

Referring now to FIG. 6a, there is shown details of processing dragging operations, which is referred to generally at block 507 in FIG. 5, block 616 in FIG. 6b, and block 626 in FIG. 6c. At the beginning of this flowchart, the scroll bar subsystem is in DRAGGING MODE. As will be seen below, when the subsystem is set to this mode, an outline of the object being dragged, i.e., a thumb or a jump tag with a thumb, is displayed on the screen. At block 601, it is checked if the user has released the button on the pointing device. If the button has not been released, then the scroll bar subsystem moves the outline at block 602. The outline is moved in accordance with the position of the cursor, that is, so that the relative position of the outline and the cursor will stay constant, except that the movement is confined to an area. The position of the cursor is included in the information accompanying the message representing the cursor movements. After moving the outline, the subsystem then notifies the host window that a dragging is going on by sending a DRAGGING message. The information accompanying the message includes current scroll position of the outline, that is, the scroll position a thumb at current position of the outline would represent. The host window may move the view of the data in response to this message, so that the user can choose a view easily. The notification is made at block 603, after which the process returns.

If the button on the pointing device has been released (decision block 601), then the subsystem notifies the end of dragging to the host window at block 604. Then it sends a SET POSITION message to itself at block 605 to change the current scroll position to the scroll position represented by the last position the outline has been moved to. Next the subsystem resets its mode to NORMAL MODE from DRAGGING MODE at block 606, and clear the outline at block 607.

At this point, if what has been dragged is only a thumb (decision block 608), the subsystem returns. Otherwise, it next sends a CHANGE RECORD message to itself at block 609, since the recorded scroll position corresponding to the dragged jump tag should be adjusted in accordance with its new position. Finally, the subsystem moves the jump tag to the position its outline has been moved to (block 610), and returns. Among the steps shown in FIG. 6a, the blocks 608, 609, and 610 are included in the addendum discussed above, in the end of last subsection.

Operation on Thumb Referring now to FIG. 6b, there is shown details of processing operations on thumb 302, which is referred to generally at block 510 in FIG. 5. At decision block 611, the scroll bar subsystem decides if the thumb is dragged. If it detects dragging, it sets itself to DRAGGING MODE at block 614, displays an outline of the thumb at block 615, calls dragging-processing subroutine at block 616, and returns. The dragging-processing subroutine has been described above and shown in FIG. 6a. If the subsystem does not detect a dragging, it decides if the user has double clicked the button on the pointing device at decision block 612. If not, it returns. Otherwise, it sends itself a RECORD POSITION message at block 613 and returns. Among the steps shown in FIG. 6b, the blocks 612 and 613 are included in the addendum discussed above.

Operation on Jump Tag

Referring now to FIG. 6c, there is shown details of processing operations on jump tag 305, which is referred to generally at block 511 in FIG. 5. At the beginning of the process, the scroll bar subsystem has decided that cursor 314 is on a jump tag and the button on the pointing device is depressed. If the cursor is in menu area 315 (decision block 617), the preferred embodiment creates a pop-up menu 316 at block 622, and returns. The pop-up menu class is provided by the system, hence the scroll bar subsystem needs not process it. If the user selects the "re-tag" item of the menu, the system sends a RE-TAG message to the scroll bar subsystem. If the user selects the "delete" item of the menu, the system sends a DELETE TAG message to the scroll bar subsystem. These messages specify the jump tag from which the pop-up menu has appeared.

If the cursor is not in menu area 315, this is a situation a jump should be invoked. However, since the system keeps sending messages that represent this situation as long as the situation lasts, a jump should be suppressed if it has been made already. Therefore, the subsystem decides at decision block 618 whether the current scroll position of the scroll bar is the same as the recorded scroll position corresponding to the jump tag. If they are not the same, the subsystem sends itself a SET POSITION message accompanied by the information of recorded scroll position at block 623, and returns. Otherwise, the subsystem next decides if the jump tag is being dragged at decision block 619. If it is, then the subsystem sets itself to DRAGGING MODE at block 624, displays an outline of the jump tag and the thumb at block 625, calls dragging-processing subroutine at block 626, which has been described above and shown in FIG. 6a, and returns.

If the jump tag is not being dragged, it is checked at decision block 620 if the user has double clicked. If not, the subsystem returns. Otherwise, it prompts the user to input the name of the jump tag and records what is input at block 621, and returns.

Processing Messages

Details of processing messages, which is referred to generally at block 405 in FIG. 4 is explained. This processes messages other than those represent user operation. These messages can be sent from the host window, the operating system, or the scroll bar subsystem itself. All message is sent specifying a scroll bar. Thus in the following description, instance data such as current scroll position or current range are of this scroll bar.

SET POSITION: If this message is received, current scroll position is set to a scroll position that is specified by the parameter accompanying the message, and the thumb is moved accordingly. Also, the host window is notified the change of position. The host window scrolls the data to match the notified scroll position, if it does not match already.

RECORD POSITION: If this message is received, a jump tag is created and displayed. Current scroll position is recorded and stored in the data structure corresponding to the new jump tag.

CHANGE RECORD: If this message is received, the recorded scroll position corresponding to specified jump tag is changed to specified scroll position. Jump tag itself is also moved if necessary. The specification is made with message parameter.

SET RANGE: If this message is received, current range is set to a specified range. Recorded scroll positions are adjusted according to the range adjustment mode as follows.

(a) NO ADJUSTMENT MODE: The numbers representing recorded scroll positions are left as they are.

Figure 7A:
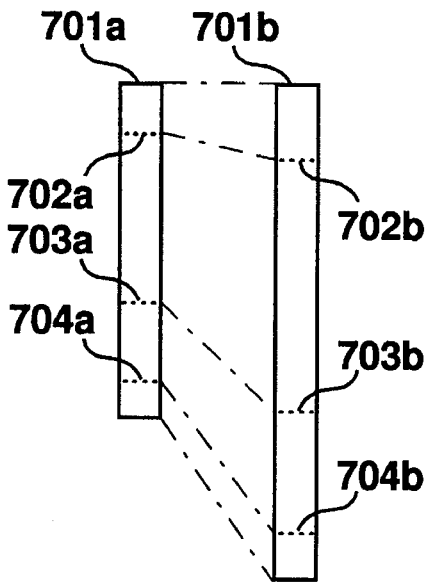
FIGS. 7a and 7b illustrates the adjusting of recorded scroll positions in the preferred embodiment schematically.

(b) PROPORTIONAL MODE: Recorded scroll positions are adjusted so that they remain the same relative to the whole range. In FIG. 7a, there is illustrated an adjustment in PROPORTIONAL MODE. The length of bar 701a represents the whole of the scroll range before it is changed. Dotted lines 702a, 703a, and 704a represent recorded positions. Bar 701b represents the range after it has been changed. Recorded scroll positions that have been represented by dotted lines 702a, 703a, and 704a are adjusted proportionally, and are represented by dotted lines 702b, 703b, and 704b respectively.

Figure 7B:
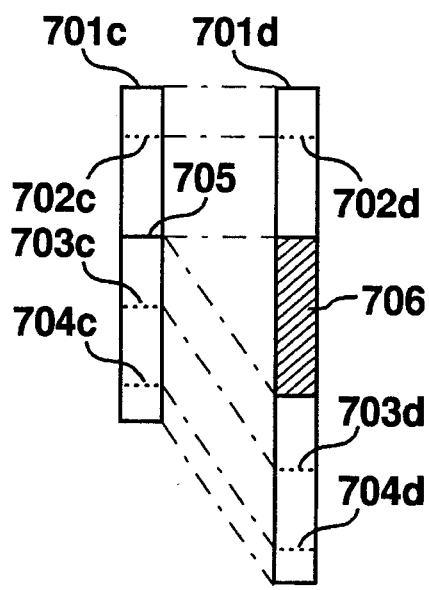

(c) INSERT MODE: Recorded positions are adjusted assuming an amount of data is inserted in (when the range is broadened) or deleted from (when narrowed) current scroll position. That is, the amount that the range is broadened (resp. narrowed) is added to (resp. subtracted from) the representing number of a recorded position if the number is larger than that of current position. In FIG. 7b, there is illustrated an adjustment in INSERT MODE. The length of bar 701c represents the whole of the scroll range before the change. Dotted lines 702c, 703c, and 704c represent recorded positions. Line 705 represents current scroll position. Bar 701d represents the range after the change. Positions represented by 702c, 703c, and 704c are adjusted as if an amount the range is broadened has been inserted at current scroll position. As a result, they are represented by dotted lines 702d, 703d, and 704d respectively, after the adjustment. Shadowed part 706 represents the inserted amount.

The range adjustment mode is by default set to INSERT MODE for a vertical scroll bar and to NO ADJUSTMENT MODE for a horizontal scroll bar. If the mode does not fit the way an application program changes the range, the user can specify the mode for each scroll bar with a system configuration utility. The scroll bar subsystem uses the specified mode as default for scroll bars that are of same direction (vertical or horizontal) and that belong to windows of the same class.

SET ADJUSTMENT MODE: This message sets the range adjustment mode to a specified one. This can be used by applications supporting the new feature of this invention.

ENUMERATE TAGS: The sender of this message receives information of all tags belonging to the scroll bar receiving the message. This message can be used by an application that stores recorded positions with the data it processes. ADD TAG: This message carries information needed for creating a jump tag including the scroll position and name. A jump tag is created based on this information upon receipt of this message. This message can be used by an application that stores recorded positions with the data it processes.

DELETE TAG: If this message is received, the preferred embodiment deletes the jump tag specified in the message.

RE-TAG: If this message is received, the recorded scroll position corresponding to specified jump tag is changed to current scroll position. Jump tag itself is also moved.

GET POSITION: If this message is received, current position is informed to its sender.

GET RANGE: If this message is received, current range is informed to its sender.

Others: Other messages may be sent to a scroll bar. These are processed in the same way as in the scroll bar of prior art. Those skilled in the art will find it easy to implement the processing of these messages.

RAMIFICATIONS AND SCOPE

While there has been illustrated and described what is at present considered to be a preferred embodiment of the present invention, it will be appreciated that numerous changes and modification are likely to occur to those skilled in the art. The following are some points they will observe.

(a) Use of scroll bars is not restricted to scrolling control. They can be, and have been, used to input "continuous" value. The present invention clearly improves this kind of use as well.

Figure 8A:
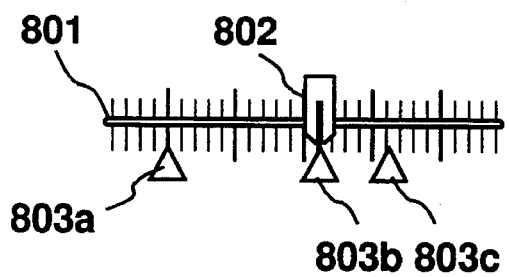
FIGS. 8a–8c illustrates various ramifications of the present invention.

(b) The shape of a scroll bar need not be an elongated rectangle enclosing a box that can be moved. Especially when used not as scrolling controller, it can take various forms. An example of such a form is shown in FIG. 8a. The user can select a value by dragging a thumb 802, which can be moved along a bar 801. A jump tag in this example looks like a small triangle indicator, on which user can click and move thumb 802 to the indicated position immediately. In the figure, 803a, 803b, and 803c are such indicators.

(c) The set of preferred alternatives can changed by application programs. Also, the data itself such as a document can carry information about the set, if the present invention is implemented as a part of specific application.

Figure 8B:
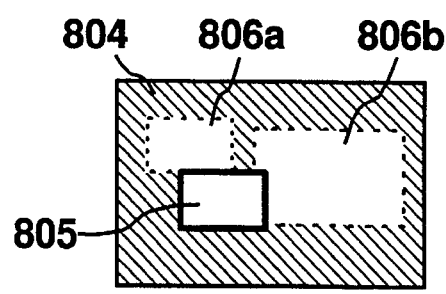

(d) The spectrum of alternatives need not be one-dimensional. An example of two-dimensional case is illustrated in FIG. 8b. This is a user interface object for controlling the view of a relatively large two-dimensional data, such as a spread sheet. A frame 804 represents the entirety of the data. Inside frame 804, a thumb 805, moving and changing size, represents the view. The user can drag thumb 805 to move the view or drag the frame of thumb 805 to change the size of the view. Jump tags in this case, 806a and 806b in FIG. 8b, are displayed inside frame 804.

Figure 8C:
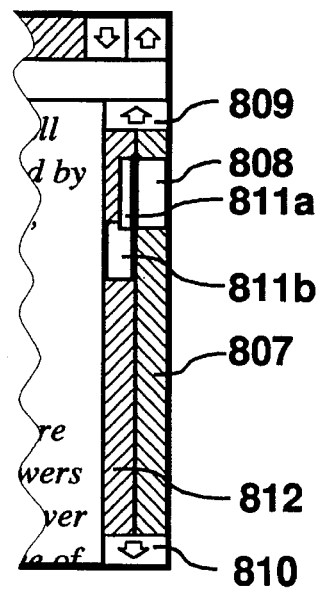

(e) As is implied in the example explained in (d) above, a scroll bar can indicate the relative size of currently viewable portion, in comparison with the whole of the data. Accordingly, jump tags can record an area inside the whole of the data. In FIG. 8c, there is illustrated another possible embodiment of the present invention. As usual, a scroll bar 807 represents the totality of the data. A thumb 808 moves along scroll bar 807 and changes its height to represent relative size of currently viewable portion of the data. Scroll arrows 809 and 810 are used in an ordinary way. Next to scroll bar 807, there is another bar 812 which contains jump tags 811a and 811b. A jump tag represents a recorded area in the data in the same way as thumb 808. Thus, the height of jump tags 811a or 811b represent the area, while their widths are changed dynamically so that they do not obscure each other entirely.

Thus the scope of the invention should be determined by the appended claims and their legal equivalents, rather than by the examples given. Accordingly, the reader will see that the scroll bar with jump tags of this invention provides an intuitive user interface which allows the user to jump to scroll positions by easy operation. Furthermore, the scroll bar with jump tag can be used as a "continuous" value selector that allows the user to select some special alternatives more easily than other alternatives, from a relatively broad range, while enabling the user to select intuitively from the whole of the range. The present invention accomplishes these objects by extending the scroll bar user interface, to which many users are already familiar with. Consequently, it provides an easy-to-use, intuitive, and easy-to-learn improved user interface that can be easily added to existing computer systems, without impacting their current user interface.

I claim:

1. A computer user interface comprising:

memory means for storing a plurality of complete sets of information;

window means for displaying a current view of a complete set of information;

a scroll bar representing scroll positions within said complete set of information and which a user can select at least one position and wherein each scroll position corresponds to a view of said set and wherein said scroll bar is simultaneously displayed with said current view;

a thumb for moving along said scroll bar indicating a current position within said set;

at least one jump tag corresponding to a preferred scroll position displayed along said scroll bar;

selecting means for selecting at least one jump tag by said user and jumping to said preferred scroll position and displaying a corresponding view of said set; and moving means for changing said preferred scroll position by dragging said jump tag along said scroll bar.

\* \* \* \* \*